UNITED STATES PATENT OFFICE.

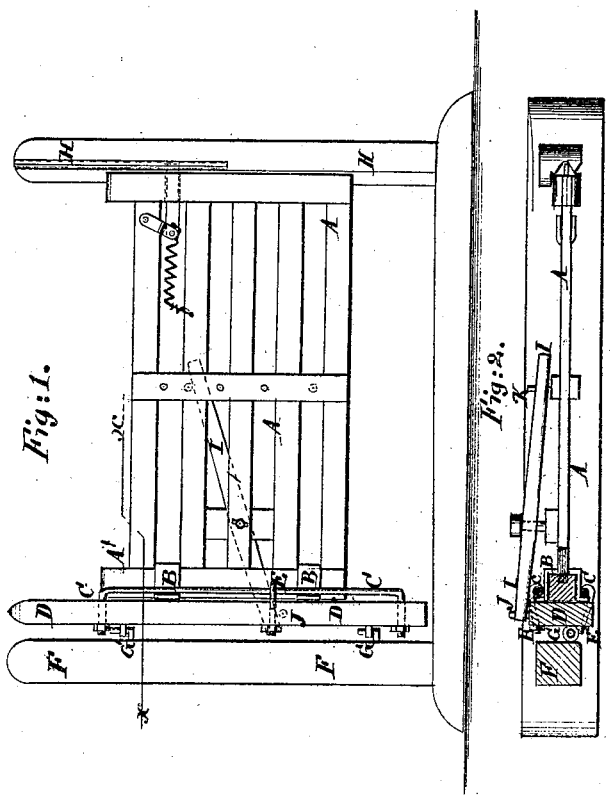

JOHN S. COVELL, OF SALT RIVER, MICHIGAN.

IMPROVEMENT IN GATES.

Specification forming part of Letters Patent No. 108,764, dated November 1, 1870.

*To all whom it may concern:*

Be it known that I, JOHN S. COVELL, of Salt River, in the county of Isabella and State of Michigan, have invented a new and useful Improvement in Gates; and I do hereby declare that the following is a full, clear, and exact description thereof, which will enable others skilled in the art to make and use the same, reference being had to the accompanying drawing, forming part of this specification.

Figure 1 is a side view of a gate to which my improvement has been attached. Fig. 2 is a top view of the same, partly in section, through the line $x\ x$, Fig. 1.

Similar letters of reference indicate corresponding parts.

My invention has for its object to furnish an improved gate which shall be so constructed that it may be conveniently raised without unlatching it, to allow it to swing over snow or other obstructions, or to allow small stock to pass beneath it, while preventing the passage of larger animals; and it consists in the construction and combination of various parts of the gate, as hereinafter more fully described.

A is the gate, to the rear upright bars, A', of which are attached two straps, B, which pass around the inner edge and the two sides of the said upright, and the ends of which are bent outward at right angles, and pass beneath the rods C, which extend up along the side of said upright, and the ends of which are bent at right angles, are passed through the hinge bar or post D, and have nuts screwed upon them at the rear side of said post D, to guard against the sagging of the gate.

The middle parts of the rods C are supported by the hook-bolts E, which hook upon the rod C, are passed through the post D, and are secured by nuts. The hook-bolts E also serve as stops to the gate A as it is moved up and down.

The bar or post D is hinged to the rear gate-post, F, by means of hinges G, in the same manner as an ordinary gate is hinged to its post.

The gate A and bar D turn together as the gate is swung open and shut, the said gate and bar having only a vertical movement on each other.

The gate A shuts against a shoulder of the forward post, H, which is made higher than the gate, and has a long groove formed in the forward side of its upper part, to receive the forward end of a spring-latch, so that the gate may be raised and lowered without unlatching it.

The forward edge of the upper part of the post H is beveled off, so that the gate will latch itself when swung shut, whether it be raised or lowered.

The lever I is pivoted to the rear part of the gate, or to a bar or block attached to said gate.

The rear end of the lever I rests against a pin, J, attached to the hinged bar D, so that the gate may be raised or lowered, whether open or shut, by operating the lever I.

The gate is secured at the desired elevation by means of a pin, K, inserted in one or the other of the holes formed for it in the middle upright bar of the gate, as shown in Figs. 1 and 2.

Having thus described my invention, I claim as new and desire to secure by Letters Patent—

The arrangement, between the fixed post F and swinging post A', having straps B, of the auxiliary and laterally-swinging post D, having rods C and hooks E thereon, as and for the purpose specified.

JOHN S. COVELL.

Witnesses:
WM. R. ROBBINS,
WILLIAM DRUM.